(12) United States Patent
Etlinger et al.

(10) Patent No.: US 12,510,219 B2
(45) Date of Patent: Dec. 30, 2025

(54) LIGHTING SYSTEM FOR A VEHICLE LIGHT

(71) Applicant: ZKW Group GmbH, Wieselburg (AT)

(72) Inventors: Stefan Etlinger, St. Pölten (AT); Jürgen Wachsenegger, Oberndorf (AT); Leopold Pritzl, Bergland (AT); Bernhard Guttmann, Perg (AT); Michael Pfeiffer, Frankenfels (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/973,349

(22) Filed: Dec. 9, 2024

(65) Prior Publication Data

US 2025/0189091 A1    Jun. 12, 2025

(30) Foreign Application Priority Data

Dec. 11, 2023   (EP) .................................. 23215632

(51) Int. Cl.
*F21S 41/19*    (2018.01)
*F21S 41/151*   (2018.01)
(Continued)

(52) U.S. Cl.
CPC ............. *F21S 41/151* (2018.01); *F21S 41/19* (2018.01); *F21S 41/24* (2018.01); *F21S 41/663* (2018.01); *F21W 2103/55* (2018.01)

(58) Field of Classification Search
CPC .......... F21S 41/24; F21S 41/151; F21S 41/19; F21S 41/663
See application file for complete search history.

(56) References Cited

U.S. PATENT DOCUMENTS

2004/0130904 A1    7/2004   Yamada et al.
2015/0085512 A1    3/2015   Kim
(Continued)

FOREIGN PATENT DOCUMENTS

DE    10101795 A1 *   7/2002   ............ F21S 43/247
DE    20211305 U1 *  10/2002   ........... B60Q 1/0052
(Continued)

OTHER PUBLICATIONS

Search English translation of WO 2012013811 A1 (Year: 2012).*
(Continued)

*Primary Examiner* — Omar Rojas Cadima
(74) *Attorney, Agent, or Firm* — Eversheds Sutherland (US) LLP

(57) ABSTRACT

A lighting system (1) for a vehicle light is disclosed, including a first illuminant (L1), a second illuminant (L2) and a light guide (4), which is arranged relative to the first illuminant and the second illuminant in such a way that light emitted by the two illuminants enters the light guide and exits via a light exit section (4c) of the light guide, wherein the lighting system has a light guiding channel element (6), which is arranged between the second illuminant and the light guide, wherein the light guiding channel element has a plurality of light guiding channels (7) arranged next to one another, wherein each light guiding channel has a wall (8), which is designed in such a way that a light beam from the second illuminant gets wider in a first plane (E1) and narrower in a second plane (E2) orthogonal to the first plane.

18 Claims, 2 Drawing Sheets

(51) Int. Cl.
  *F21S 41/24* (2018.01)
  *F21S 41/663* (2018.01)
  *F21W 103/55* (2018.01)

(56) References Cited

U.S. PATENT DOCUMENTS

2018/0142851 A1  5/2018  Bungenstock et al.
2019/0293857 A1  9/2019  Martoch et al.

FOREIGN PATENT DOCUMENTS

| EP | 4006411 A1 | | 6/2022 | |
|---|---|---|---|---|
| KR | 20140000632 A | * | 1/2014 | ........... B60Q 1/0047 |
| WO | WO-2012013811 A1 | * | 2/2012 | ............. B60Q 1/304 |

OTHER PUBLICATIONS

Espacenet English translation of DE20211305U1 (Year: 2002).*
Search English translation of DE-10101795-A1 (Year: 2002).*
Search English translation of KR-20140000632-A (Year: 2013).*
Extended European Search Report for European Patent Application No. 23215632.3 dated Jun. 7, 2024 (9 Pages).

* cited by examiner

LIGHTING SYSTEM FOR A VEHICLE LIGHT

CROSS-REFERENCE TO RELATED APPLICATIONS

This application claims priority to European Patent Application No. 23215632.3, filed Dec. 11, 2023, which is incorporated herein by reference.

TECHNICAL FIELD

The invention relates to a lighting system for a vehicle light, in particular for a motor vehicle headlight, wherein the lighting system comprises the following:
- a first illuminant, which is designed to emit light along a first light emission direction,
- a second illuminant, comprising a plurality of individually controllable light sources, wherein the individual light sources are arranged spaced apart from one another on a light source support of the second illuminant and designed to emit light along a second light emission direction, which is different from the first light emission direction,
- a light guide, in particular an optical fibre, which is arranged downstream of the second illuminant along the second light emission direction, wherein the light guide has a first light entry section, from which an outer surface delimiting the light guide extends away along an axial longitudinal extension of the light guide, wherein a rear side of the outer surface is designed as the second light entry section and a front side of the outer surface opposite the rear side is designed as a light exit section, wherein the light guide is arranged relative to the first illuminant in such a way that light emitted by the first illuminant enters the light guide via the first light entry section, wherein light injected by the first illuminant propagates axially within the outer surface, in particular at least in sections, along the longitudinal extension of the light guide, wherein the light guide is designed in such a way that light that enters via the first light entry section exits via the light exit section of the light guide along the second light emission direction, wherein the light exit section, in particular the entire front side of the outer surface and/or the entire rear side of the outer surface, is designed for diffuse scattering, wherein the light guide is arranged relative to the second illuminant in such a way that the longitudinal extension of the light guide is oriented substantially orthogonal to the second light emission direction, the second light entry section of the outer surface faces the second illuminant and the light exit section of the outer surface faces away from the second illuminant.

The invention further relates to a vehicle light, for example a motor vehicle headlight, or a vehicle, preferably a motor vehicle, comprising a lighting system.

TECHNICAL BACKGROUND

Lighting systems that use a light guide for light emission are known in the prior art. The light guide is typically used together with an illuminant to produce a static light function (i.e. one that is not animated or has no animation effect). A dynamic and high-resolution light function to be produced to complement or supplement the static light function is not provided in light guide-based systems. A dynamic and high-resolution light function is produced in a known manner with another or additional light module (or illumination device). For example, a static rear light of a motor vehicle can be produced with a first light module, which has a light guide, and a dynamic, animated direction indicator can be produced with a second light module, which has a plurality of LEDs. Integration of both light modules into a system is not envisaged in the prior art as the production of animated and high-resolution light functions is not envisaged with a light guide. The known solutions which use various light modules for dynamic/high resolution light functions and static light functions are disadvantageously complex as two separated light modules have to be used.

SUMMARY OF THE INVENTION

The object of the present invention consists in mitigating or eliminating the disadvantages of the prior art. The object of the invention is therefore in particular to create a lighting system which can produce high-resolution, dynamic and static light functions simply and with a high level of uniformity.

According to the invention, the lighting system has a light guiding channel element, which is arranged between the second illuminant and the rear side of the outer surface, wherein the light guiding channel element has a plurality of light guiding channels arranged next to one another, which open out at the second light entry section of the outer surface, wherein each light source of the second illuminant is associated with a light guiding channel in such a way that light from a light source enters the light guiding channel associated with the light source via a light entry area of the light guiding channel and exits the light guiding channel via a light exit area of the light guiding channel, wherein the light guiding channel element is arranged relative to the rear side of the outer surface in such a way that each light exit area is associated with a partial region of the second light entry section such that light that exits a light exit area of a certain light guiding channel strikes that partial region of the second light entry section associated with the light exit area of the corresponding light guiding channel, wherein light that enters via the partial regions of the second light entry section passes radially through the light guide and exits via the light exit section of the light guide along the second light emission direction, wherein each light guiding channel is formed by a wall which delimits the light guiding channel and which extends between the light entry area and the light exit area along the second light emission direction, preferably in the shape of a funnel, wherein the wall has side surfaces, which are designed in such a way that a light beam entering the light guiding channel from a light source of the second illuminant is wider at the light exit area than at the light entry area due to reflection or scattering on side surfaces in a first plane, which is orientated parallel to the axial longitudinal extension of the light guide, and in that a light beam entering the light guiding channel from a light source of the second illuminant is narrower at the light exit area than at the light entry area due to reflection or scattering on side surfaces in a second plane, which is oriented orthogonal to the first plane and orthogonal to the axial longitudinal extension of the light guide.

This has the advantage that the light from the second illuminant is widened by the light guiding channel element (or when passing through the light guiding channels of the light guiding channel element) onto the second light entry surface in the first plane and is focused in the second. This can result in both a high amount of light being able to reach the second light entry surface and as uniform emission behaviour as possible between adjacent sections of the light entry surface (which are illuminated by light from adjacent light guiding channels). Thus, a first, static light function can be produced with the first illuminant and the light guide and at the same time a second, high resolution and/or dynamic light function can be produced with the second illuminant, which radiates radially through the light guide. There is preferably a gap of 10 to 50 mm, preferably 15 to 45 mm, in particular 20 to 40 mm between two adjacent light sources of the second illuminant. The second light sources are preferably arranged along the entire axial longitudinal extension of the light guide. In particular, the light guide is illuminated axially by the light from the first illuminant and at the same time radially by the light from the second illuminant.

It may be provided that the wall has at least four side surfaces, wherein two side surfaces are respectively opposite each other in pairs, wherein a first side surface pair, which is formed from two side surfaces, which are arranged spaced apart from one another along the axial longitudinal extension of the light guide, diverge along the second light emission direction, wherein a second side surface pair, which is formed from two side surfaces, which are arranged spaced apart from one another along a radial direction of the light guide orthogonal to the axial longitudinal extension, converge towards one another along the second light emission direction.

It may be provided that the lighting system has a cover lens, which is arranged along the second light emission direction downstream of the light guiding channel element and preferably downstream of the light guide, wherein the cover lens preferably has a retaining portion, to which the light guide is attached.

It may be provided that the lighting system has a cover lens, which is arranged along the second light emission direction downstream of the light guiding channel element and preferably downstream of the light guide, wherein the cover lens has an area which is transparent to the light from the first illuminant and from the second illuminant and which is surrounded by an area which is non-transparent to the light from the first illuminant and from the second illuminant, wherein the cover lens is arranged relative to the light guiding channel element and the light guide in such a way that light that exits the light exit section of the light guide passes, preferably exclusively, through the transparent area of the cover lens.

It may be provided that the light sources are arranged on the light source support along a notional line and thus form a light source row, wherein the light source row preferably follows the axial longitudinal extension of the light guide.

It may be provided that the light guide is substantially cylindrical, wherein the first light entry section is formed on a base surface of the cylindrical light guide and the second light entry section and the light exit section are formed on a cylinder jacket, in particular on opposite sides of a cylinder jacket, of the cylindrical light guide.

It may be provided that the light guide and the first illuminant are designed to produce a daytime running light.

It may be provided that the light guide and the plurality of light sources of the second illuminant are designed to produce a signal light, in particular a dynamic signal light, for example a direction indicator or a turn signal with a sequential light effect.

It may be provided that light injected by the first illuminant into the light guide propagates within the light guide by means of total reflection on the outer surface along the longitudinal extension of the light guide.

It may be provided that the first illuminant is arranged relative to the second illuminant in such a way that the first light emission direction is oriented orthogonal to the second light emission direction.

It may be provided that the light guiding channel element is designed in such a way that light exiting the light guiding channels illuminates the entire second light entry area of the outer surface, wherein the light guiding channel element is preferably designed as a light guide screen.

It may be provided that the first side surface pair and/or the second side surface pair has/have a surface that diffusely scatters light from the second illuminant, wherein the first side surface pair and/or the second side surface pair preferably has/have a diffusely scattering coating and/or is/are white-matt or white-opaque, or, wherein the first side surface pair and/or the second side surface pair is/are designed to reflect light from the second illuminant, preferably diffusely, and in particular has/have a preferably diffusely reflecting coating, for example a metallic coating.

It may be provided that the light guiding channel element is designed in such a way that light exiting two adjacent light guiding channels strikes the second light entry section without overlapping.

It may be provided that light from the second illuminant injected via the partial regions of the second light entry section is superimposed with that light that is radially injected by the first illuminant via the first light entry area into the light guide, after exiting via the light exit section along the second light emission direction.

It may be provided that the light guiding channel element has an attachment section, to which the light guide is attached. The attachment section may be funnel-shaped or frustoconical, in particular the attachment section may be trapezoidal in a sectional plane oriented parallel to the second plane, or the attachment section may be trench-shaped along the axial longitudinal extension of the light guide. The light guide may lie within a tapered funnel opening of the attachment section or be held there. The attachment section may be arranged along the second light emission direction downstream of the light exit areas of the light guiding channels, and preferably upstream of a cover lens. A base (the longer base side) of the trapezoidal attachment section is preferably further (i.e. facing away) from the second illuminant and the shorter base side of the trapezoidal attachment section opposite the base is nearer (i.e. facing) the illuminant, wherein the base of the trapezoidal attachment section is preferably shorter than the diameter of the light guide.

It may be provided that the wall delimiting a light guiding channel delimits a cavity, through which the light from the light source associated with the light guiding channel passes.

It may be provided that the cavity is free of optically active elements, for example one or more lenses, optical fibres or light guiding optics.

A vehicle light, for example a motor vehicle headlight, or a vehicle may be provided, comprising a lighting system.

In the context of this description, the terms "above", "below", "horizontal", "vertical" should be understood as indications of orientation when the lighting system is arranged in its normal position of use after having been fitted to a motor vehicle or a motor vehicle headlight.

BRIEF DESCRIPTION OF THE FIGURES

The invention will be explained below in more detail based on schematic drawings of an exemplary embodiment.

DETAILED DESCRIPTION OF THE EMBODIMENTS

Figure 1:
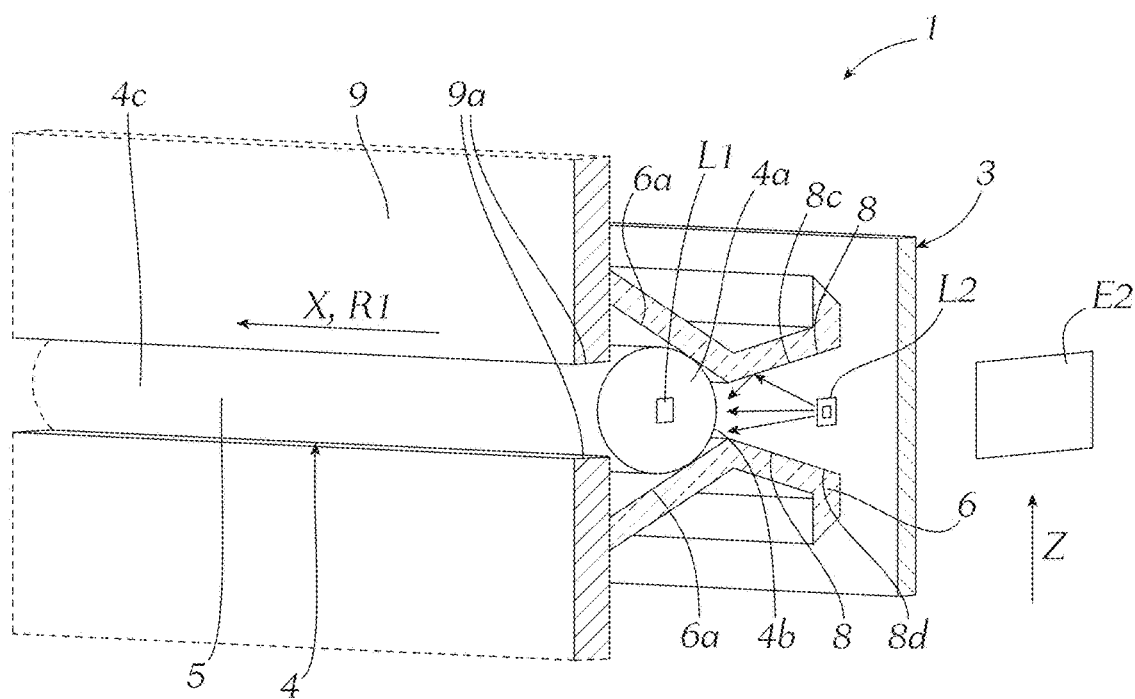
FIG. 1 shows a schematic view of a lighting system according to the invention.

FIG. 1 shows an exemplary embodiment according to the invention of a lighting system 1 for a vehicle light, wherein the vehicle light may be, for example, a motor vehicle headlight, a component of a motor vehicle headlight, or a signal light for a motor vehicle.

Figure 2:
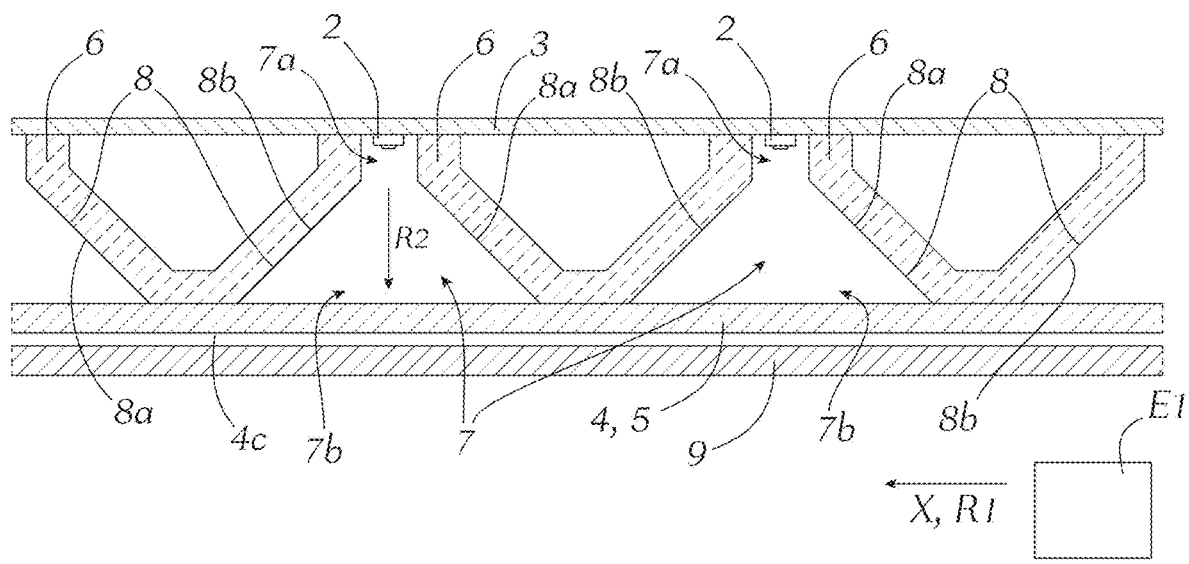
FIG. 2 shows a sectional view of the lighting system according to FIG. 1.

FIG. 2 shows a top view of a section through the lighting system shown in FIG. 1, wherein the section is made through a horizontal sectional plane in the sheet plane of FIG. 1.

Figure 3:
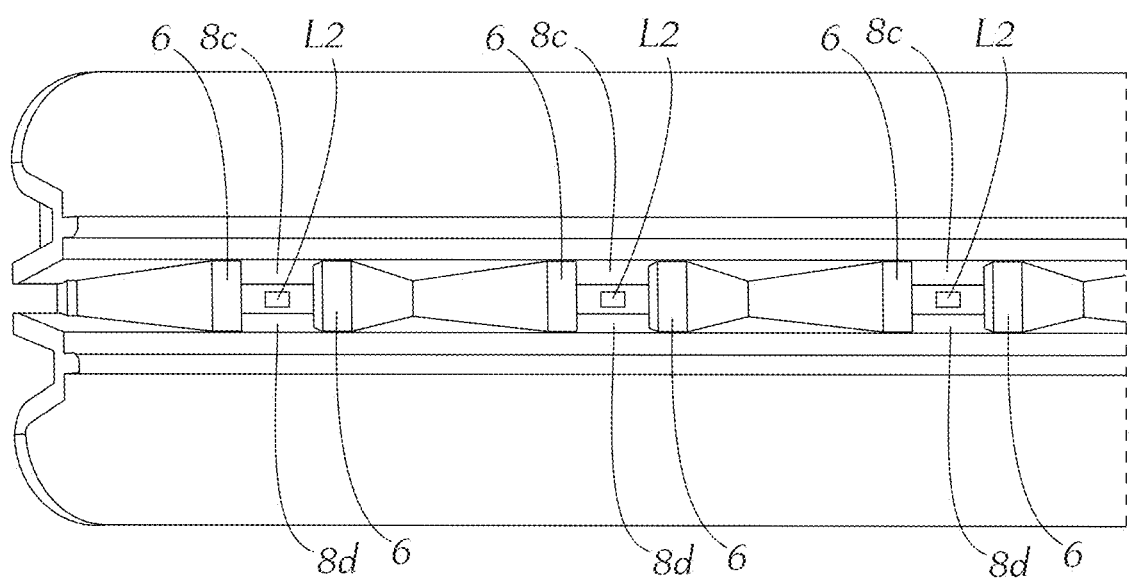
FIG. 3 shows a rear view of the lighting system according to FIG. 1.

FIG. 3 shows a rear view of the lighting system shown in FIG. 1.

The lighting system 1 comprises a first illuminant L1, which is designed to emit light along a first light emission direction R1.

The lighting system 1 further comprises a second illuminant L2, which has a plurality of individually controllable light sources 2. The individual light sources 2 are arranged spaced apart from one another on a light source support 3 (for example a flexible circuit board) of the second illuminant L2 and designed to emit light along a second light emission direction R2 (cf. FIG. 2), which is different from the first light emission direction R1.

In the exemplary embodiment shown, the first illuminant L1 is arranged relative to the second illuminant L2 in such a way that the first light emission direction R1 is oriented orthogonal to the second light emission direction R2. The sectional plane of the sectional view shown in FIG. 2 is parallel to the second light emission direction R2 and intersects the light sources 2 of the second illuminant L2.

The lighting system 1 comprises a light guide 4, in particular an optical fibre, which is arranged downstream of the second illuminant L2 along the second light emission direction R2. The light guide 4 has a first light entry section 4a, from which an outer surface 5 delimiting the light guide extends away along an axial longitudinal extension x of the light guide 4. A rear side of the outer surface 5 (which faces the second illuminant L2) is designed as the second light entry section 4b and a front side of the outer surface 5 (which faces away from the second illuminant L2) opposite the rear side is designed as a light exit section 4c.

The light guide 4 is arranged relative to the first illuminant L1 in such a way that light emitted by the first illuminant L1 enters the light guide 4 via the first light entry section 4a. Light injected by the first illuminant L1 propagates axially within the outer surface 5, in particular at least in sections, along the longitudinal extension x of the light guide 4. Light injected by the first illuminant L1 into the light guide 4 may propagate within the light guide 4 by means of total reflection on the outer surface 5 along the longitudinal extension x of the light guide 4. The light guide 4 is designed in such a way that light that enters via the first light entry section 4a exits via the light exit section 4c of the light guide 4 along the second light emission direction R2. For this, deflection prisms are provided, for example, on the inside of the rear side of the outer surface, which deflect the injected light towards the light exit section 4c. The light exit section 4c, in particular the entire front side of the outer surface 5 and/or the entire rear side of the outer surface 5, is or are designed for diffuse scattering. This means that the light has no defined direction after exiting the light guide 4 or not all light rays are oriented parallel to one another, but rather form a light emission cone around the second light emission direction R2 or propagate divergently in space, for example. The light emission behaviour of the light guide 4 may, for example, correspond to the emission behaviour of a diffuser or a Lambertian emitter.

The light guide 4 is further arranged relative to the second illuminant L2 in such a way that the longitudinal extension x of the light guide 4 is oriented substantially orthogonal to the second light emission direction R2 (cf. FIG. 2). The second light entry section 4b of the outer surface 5 faces the second illuminant L2 and the light exit section 4c of the outer surface 5 in turn faces away from the second illuminant L2. In the exemplary embodiment shown, the light guide 4 is substantially cylindrical. The first light entry section 4a is formed on a base surface of the cylindrical light guide and the second light entry section 4b and the light exit section 4c are formed on a cylinder jacket, in particular on opposite sides of a cylinder jacket, of the cylindrical light guide 4. The light guide 4 and the first illuminant L1 can be designed to produce a daytime running light.

In the exemplary embodiment shown, the light sources 2 are arranged on the light source support 3 along a notional line and thus form a light source row. The light source row follows the axial longitudinal extension x of the light guide 4, wherein there is a gap of more than 0 mm, in particular a gap between 10 mm and 50 mm, between two light sources. The light guide 4 and the plurality of light sources 2 of the second illuminant L2 can be designed, for example, to produce a signal light, in particular a dynamic signal light, for example a direction indicator or a turn signal with a sequential light effect. A sequential light effect can be produced by successively switching on adjacent light sources 2, for example, by virtue of the light sources 2 being individually controllable.

The lighting system 1 comprises a light guiding channel element 6, which is arranged between the second illuminant L2 and the rear side of the outer surface 5. The light guiding channel element 6 has a plurality of light guiding channels 7 arranged next to one another, which respectively open out at the second light entry section 4b of the outer surface 5.

As shown in FIG. 2, each light source 2 of the second illuminant L2 is associated with a light guiding channel 7. Light from a certain light source 2 enters the light guiding channel 7 associated therewith via a light entry area 7a of the light guiding channel 7. At the end of the light guiding channel 7, the light exits it again via a light exit area 7b of the light guiding channel 7. The light guiding channel element 6 is arranged relative to the rear side of the outer surface 5 in such a way that each light exit area 7b is associated with a partial region of the second light entry section 4b. Light that exits a light exit area 7b of a certain light guiding channel 7 can therefore strike that partial region of the second light entry section 4b associated with the light exit area 7b of the corresponding light guiding channel 7. Light that enters via the partial regions of the second light entry section 4b passes radially through the light guide 4 and subsequently exits via the light exit section 4c of the light guide 4 along the second light emission direction R2.

In the exemplary embodiment shown, the light guiding channel element 6 is designed in such a way that light exiting the light guiding channels 7 illuminates the entire second light entry area 4b of the outer surface 5, wherein the light guiding channel element 6 is preferably designed as a light guide screen. Furthermore, in the exemplary embodiment shown, the light guiding channel element 6 is designed in such a way that light exiting two adjacent light guiding channels 7 strikes the second light entry section 4b without overlapping. Light injected via the partial regions of the second light entry section 7b can be superimposed with that light that is radially injected by the first illuminant L1 via the first light entry area 4a into the light guide 4, after exiting via the light exit section 4c along the second light emission direction R2. Depending on the (On/Off) operating state of the first illuminant L1 and the second illuminant L2, only light from the first illuminant L1, only light from the second illuminant L2, or an overall light from the first illuminant L1 and the second illuminant L2 can exit the light guide 4.

Each light guiding channel 7 comprises a wall 8 delimiting the light guiding channel 7. It extends, for example in the shape of a funnel, between the light entry area 7a and the light exit area 7b along the second light emission direction R2. The wall 8 may delimit a cavity, through which the light from the light source 2 associated with the light guiding channel 7 passes. The cavity may be free of optically active elements, for example one or more lenses, optical fibres or light guiding optics.

The wall 8 has side surfaces 8a, 8b, 8c, 8d, which are designed on one side such that a light beam entering the light guiding channel 7 from a light source 2 of the second illuminant L2 is wider at the light exit area 7b than at the light entry area 7a due to reflection or scattering on side surfaces 8a, 8b in a first plane E1, which is oriented parallel to the axial longitudinal extension x of the light guide 4.

On the other side, the side surfaces 8a, 8b, 8c, 8d are designed such that a light beam entering the light guiding channel 7 from a light source 2 of the second illuminant L2 is narrower at the light exit area 7b than at the light entry area 7a due to reflection or scattering on side surfaces 8c, 8d in a second plane E2, which is oriented orthogonal to the first plane E1 and orthogonal to the axial longitudinal extension x of the light guide 4.

As shown in FIG. 2, the wall 8 comprises at least four side surfaces 8a, 8b, 8c, 8d, wherein two side surfaces are respectively opposite each other in pairs.

A first side surface pair, which is formed from two side surfaces 8a, 8b, which are arranged spaced apart from one another along the axial longitudinal extension x of the light guide 4, diverge along the second light emission direction R2.

A second side surface pair, which is formed from two side surfaces 8c, 8d (cf. FIG. 1 and FIG. 3), which are arranged spaced apart from one another along a radial direction z of the light guide 4 orthogonal to the axial longitudinal extension x, converge towards one another along the second light emission direction R2.

The first side surface pair 8a, 8b and/or the second side surface pair 8c, 8d may have a surface that diffusely scatters light from the second illuminant L2. The first side surface pair 8a, 8b and/or the second side surface pair 8c, 8d can have a diffusely scattering coating and/or be white-matt or white-opaque. The first side surface pair 8a, 8b and/or the second side surface pair 8c, 8d can also be designed to reflect light from the second illuminant L2, preferably diffusely, and can in particular have a preferably diffusely reflecting coating, for example a metallic coating.

The lighting system can have an (optional) cover lens 9, which is arranged along the second light emission direction R2 downstream of the light guiding channel element 6 and preferably downstream of the light guide 4. The cover lens 9 can have a retaining portion 9a, to which the light guide 4 is attached or on which the light guide rests, for example with the front side of the outer surface 5.

The cover lens 9 may have an area which is transparent to the light from the first illuminant L1 and from the second illuminant L2 and which is surrounded by an area which is non-transparent to the light from the first illuminant L1 and from the second illuminant L2. The cover lens 9 may be arranged relative to the light guiding channel element 6 and the light guide 4 in such a way that light that exits the light exit section 4c of the light guide 4 passes, preferably exclusively, through the transparent area of the cover lens 9.

The light guiding channel element 6 may have an attachment section 6a, to which the light guide 4 is attached.

In the exemplary embodiment shown, the attachment section 6a is trench-shaped or, in a section through the plane E2, trapezoidal. The attachment section 6a ends at the cover lens 9, whereby the light guide 4 is held in position by the cover lens 9 and the attachment section 6a or attached along the direction R2 and along the direction z. In the exemplary embodiment shown, in the plane E2, the light guiding channel 7 and the adjoining attachment section 6a are double funnel-shaped or hourglass-shaped.

REFERENCE LIST 1 lighting system
2 light sources
3 light source support
4 light guide
4a first light entry section
4b second light entry section
4c light exit section
5 outer surface
6 light guiding channel element
6a attachment section
7 light guiding channel
7a light entry area of a light guiding channel
7b light exit area of a light guiding channel
8 wall
8a, 8b first side surface pair
8c, 8d second side surface pair
9 cover lens
9a retaining portion of the cover lens
E1 first plane
E2 second plane
L1 first illuminant
L2 second illuminant
R1 first light emission direction
R2 second light emission direction
X axial longitudinal extension
Z radial direction That which is claimed is:

1. A lighting system (1) for a vehicle light, or a motor vehicle headlight, comprising:
a first illuminant (L1), which is designed to emit light along a first light emission direction (R1);
a second illuminant (L2), comprising a plurality of individually controllable light sources (2), wherein the individual light sources (2) are arranged spaced apart from one another on a light source support (3) of the second illuminant (L2) and designed to emit light along a second light emission direction (R2), which is different from the first light emission direction (R1); and
a light guide (4), which comprises an optical fibre, which is arranged downstream of the second illuminant (L2) along the second light emission direction (R2), wherein the light guide (4) has a first light entry section (4a), from which an outer surface (5) delimiting the light guide extends away along an axial longitudinal extension (x) of the light guide (4), wherein a rear side of the outer surface (5) is designed as the second light entry section (4b) and a front side of the outer surface (5) opposite the rear side is designed as a light exit section (4c), wherein the light guide (4) is arranged relative to the first illuminant (L1) in such a way that light emitted by the first illuminant (L1) enters the light guide (4) via the first light entry section (4a), wherein light injected by the first illuminant (L1) propagates axially within the outer surface (5), at least in sections, along the longitudinal extension (x) of the light guide (4), wherein the light guide (4) is designed in such a way that light that enters via the first light entry section (4a) exits via the light exit section (4c) of the light guide (4) along the second light emission direction (R2), wherein the light exit section (4c), is designed for diffuse scattering, wherein the light guide (4) is arranged relative to the second illuminant (L2) in such a way that the longitudinal extension (x) of the light guide (4) is oriented substantially orthogonal to the second light emission direction (R2), the second light entry section (4b) of the outer surface (5) faces the second illuminant (L2) and the light exit section (4c) of the outer surface (5) faces away from the second illuminant (L2), wherein the lighting system (1) has a light guiding channel element (6), which is arranged between the second illuminant (L2) and the rear side of the outer surface (5), wherein the light guiding channel element (6) has a plurality of light guiding channels (7) arranged next to one another, which open out at the second light entry section (4b) of the outer surface (5), wherein each light source (2) of the second illuminant (L2) is associated with a light guiding channel (7) in such a way that light from a light source (2) enters the light guiding channel (7) associated with the light source (2) via a light entry area (7a) of the light guiding channel (7) and exits the light guiding channel (7) via a light exit area (7b) of the light guiding channel (7), wherein the light guiding channel element (6) is arranged relative to the rear side of the outer surface (5) in such a way that each light exit area (7b) is associated with a partial region of the second light entry section (4b) such that light that exits a light exit area (7b) of a certain light guiding channel (7) strikes that partial region of the second light entry section (4b) associated with the light exit area (7b) of the corresponding light guiding channel (7), wherein light that enters via the partial regions of the second light entry section (4b) passes radially through the light guide (4) and exits via the light exit section (4c) of the light guide (4) along the second light emission direction (R2), wherein each light guiding channel (7) is formed by a wall (8) which delimits the light guiding channel (7) and which extends between the light entry area (7a) and the light exit area (7b) along the second light emission direction (R2), wherein the wall (8) has side surfaces (8a, 8b, 8c, 8d), which are designed in such a way that a light beam entering the light guiding channel (7) from a light source (2) of the second illuminant (L2) is wider at the light exit area (7b) than at the light entry area (7a) due to reflection or scattering on side surfaces (8a, 8b) in a first plane (E1), which is orientated parallel to the axial longitudinal extension (x) of the light guide (4), wherein a light beam entering the light guiding channel (7) from a light source (2) of the second illuminant (L2) is narrower at the light exit area (7b) than at the light entry area (7a) due to reflection or scattering on side surfaces (8c, 8d) in a second plane (E2), which is oriented orthogonal to the first plane (E1) and orthogonal to the axial longitudinal extension (x) of the light guide (4), wherein the lighting system (1) further comprises a cover lens (9), which is arranged along the second light emission direction (R2) downstream of the light guiding channel element (6) and downstream of the light guide (4), wherein the cover lens (9) has a retaining portion (9a) to which the light guide (4) is attached, and wherein the light guiding channel element (6) has an attachment section (6a) to which the light guide (4) is attached, wherein the attachment section (6a) ends at the cover lens (9), whereby the light guide (4) is held in position by the cover lens (9) and the attachment section (6a).

2. The lighting system according to claim 1, wherein the wall (8) has at least four side surfaces (8a, 8b, 8c, 8d), wherein two side surfaces are respectively opposite each other in pairs, wherein a first side surface pair, which is formed from two side surfaces (8a, 8b), which are arranged spaced apart from one another along the axial longitudinal extension (x) of the light guide (4), diverge along the second light emission direction (R2), wherein a second side surface pair, which is formed from two side surfaces (8c, 8d), which are arranged spaced apart from one another along a radial direction (z) of the light guide (4) orthogonal to the axial longitudinal extension (x), converge towards one another along the second light emission direction (R2).

3. The lighting system according to claim 1, wherein the cover lens (9) has an area which is transparent to the light from the first illuminant (L1) and from the second illuminant (L2) and which is surrounded by an area which is non-transparent to the light from the first illuminant (L1) and from the second illuminant (L2), wherein the cover lens (9) is arranged relative to the light guiding channel element (6) and the light guide (4) in such a way that light that exits the light exit section (4c) of the light guide (4) passes through the transparent area of the cover lens (9).

4. The lighting system according to claim 1, wherein the light sources (2) are arranged on the light source support (3) along a notional line and thus form a light source row, wherein the light source row follows the axial longitudinal extension (x) of the light guide (4).

5. The lighting system according to claim 1, wherein light injected by the first illuminant (L1) into the light guide (4) propagates within the light guide (4) by means of total reflection on the outer surface (5) along the longitudinal extension (x) of the light guide (4).

6. The lighting system according to claim 1, wherein the first illuminant (L1) is arranged relative to the second illuminant (L2) in such a way that the first light emission direction (R1) is oriented orthogonal to the second light emission direction (R2).

7. The lighting system according to claim 1, wherein the light guiding channel element (6) is designed in such a way that light exiting the light guiding channels (7) illuminates the entire second light entry area (4b) of the outer surface (5), wherein the light guiding channel element (6) is designed as a light guide screen.

8. The lighting system according to claim 1, wherein the light guiding channel element (6) is designed in such a way that light exiting two adjacent light guiding channels (7)

strikes the second light entry section (4*b*) without overlapping, wherein light from the second illuminant (L2) injected via the partial regions of the second light entry section (7*b*) is superimposed with that light that is radially injected by the first illuminant (L1) via the first light entry area (4*a*) into the light guide (4), after exiting via the light exit section (4*c*) along the second light emission direction (R2).

9. The lighting system according to claim 1, wherein the wall (8) delimiting a light guiding channel (7) delimits a cavity, through which the light from the light source (2) associated with the light guiding channel (7) passes, wherein the cavity is free of optically active elements.

10. A motor vehicle headlight, comprising a lighting system according to claim 1.

11. The lighting system according to claim 1, wherein each light guiding channel (7) is in the shape of a funnel.

12. The lighting system according to claim 1, wherein the entire front side of the outer surface (5) and/or the entire rear side of the outer surface (5) is designed for diffuse scattering.

13. The lighting system according to claim 1, wherein the first side surface pair (8*a*, 8*b*) and/or the second side surface pair (8*c*, 8*d*) is/are designed to reflect light from the second illuminant (L2) has/have a diffusely reflecting coating, wherein the diffusely reflecting coating is a metallic coating.

14. The lighting system according to claim 1, wherein the light guide (4) is substantially cylindrical, wherein the first light entry section (4*a*) is formed on a base surface of the cylindrical light guide and the second light entry section (4*b*) and the light exit section (4*c*) are formed on a cylinder jacket of the cylindrical light guide (4).

15. The lighting system according to claim 14, wherein the second light entry section (4*b*) and the light exit section (4*c*) are formed on opposite sides of the cylinder jacket.

16. The lighting system according to claim 1, wherein the light guide (4) and the first illuminant (L1) are designed to produce a daytime running light, wherein the light guide (4) and the plurality of light sources (2) of the second illuminant (L2) are designed to produce a dynamic signal light.

17. The lighting system according to claim 16, wherein the dynamic signal light is a direction indicator or a turn signal with a sequential light effect.

18. The lighting system according to claim 1, wherein the first side surface pair (8*a*, 8*b*) and/or the second side surface pair (8*c*, 8*d*) has/have a surface that diffusely scatters light from the second illuminant (L2), wherein the first side surface pair (8*a*, 8*b*) and/or the second side surface pair (8*c*, 8*d*) has/have a diffusely scattering coating and/or is/are white-matt or white-opaque.

* * * * *